United States Patent [19]

Miller et al.

[11] 4,447,317

[45] May 8, 1984

[54] HYDROPROCESSING WITH LITHIUM-CONTAINING CATALYST

[75] Inventors: J. Wayne Miller, Yorba Linda; Howard D. Simpson, Irvine, both of Calif.

[73] Assignee: Union Oil Company of California, Los Angeles, Calif.

[21] Appl. No.: 491,896

[22] Filed: May 5, 1983

Related U.S. Application Data

[62] Division of Ser. No. 314,526, Oct. 26, 1981, Pat. No. 4,394,302.

[51] Int. Cl.$^3$ ............................................. C10G 45/04
[52] U.S. Cl. ................................ 208/216 R; 208/217; 208/251 H; 208/89
[58] Field of Search ............... 208/216 R, 217, 251 H, 208/89

[56] References Cited

U.S. PATENT DOCUMENTS

| | | | |
|---|---|---|---|
| 3,836,453 | 9/1974 | Kovach et al. | 208/216 R |
| 4,003,828 | 1/1977 | Eberly, Jr. | 208/216 R |
| 4,038,177 | 7/1977 | Eberly, Jr. | 208/216 R |
| 4,186,078 | 1/1980 | Itoh et al. | 208/216 PP |
| 4,394,302 | 7/1983 | Miller et al. | 208/216 R |

*Primary Examiner*—Delbert E. Gantz
*Assistant Examiner*—Lance Johnson
*Attorney, Agent, or Firm*—Alan H. Thompson; Gregory F. Wirzbicki; Dean Sandford

[57] ABSTRACT

The porosity and surface area of refractory oxides are modified by adding a lithium component thereto and then calcining. The resultant material, having a lower surface area, a lower total pore volume, and a larger average pore diameter in comparison to the original refractory oxide, is highly useful as a catalyst support, particularly with respect to hydrodesulfurization catalysts.

20 Claims, No Drawings

HYDROPROCESSING WITH LITHIUM-CONTAINING CATALYST

This application is a division of application Ser. No. 314,526, filed Oct. 26, 1981, now U.S. Pat. No. 4,394,302.

BACKGROUND OF THE INVENTION

1. Description of the Prior Art

Residual petroleum oil fractions, such as the heavy fractions produced in atmospheric and vacuum crude distillation columns, are usually undesirable as feedstocks for most refining processes due to their high metals and sulfur content. The presence of high concentrations of sulfur and metals, the latter often being found in relatively large porphyrin molecules, precludes the effective use of residua as feedstocks for cracking, hydrocracking, and similar catalytic refining operations.

One method known for reducing the sulfur and metals content of residua is hydrodesulfurization, a process wherein a residuum, usually containing the bulk of the asphaltene components of the original crude from which the residuum was derived, is contacted with a catalyst, generally composed of cobalt and/or nickel components plus molybdenum components on a porous refractory oxide support, under conditions of elevated temperature and pressure and in the presence of hydrogen such that the sulfur components are converted to hydrogen sulfide while the metals are simultaneously deposited on the catalyst.

It has been recognized that catalysts having specific pore size distributions and/or surface area characteristics are effective for hydrodesulfurization purposes. For example, U.S. Pat. Nos. 4,082,695 and 4,089,774 describe processes for removing metals and sulfur from residua with catalysts having specific pore size distributions.

Numerous processes have been suggested in the prior art to improve the porosity characteristics of support particles used in catalysts. One such process, disclosed in U.S. Pat. No. 2,890,162 involves impregnating a porous starting material with a molybdenum and/or cobalt metal component that serves as a pore size distribution growth promoter. Another such process, disclosed in U.S. Pat. No. 4,022,715, involves incorporating a blowing agent in the catalyst materials. Other processes provide only limited improvements in porosity before other desirable properties such as strength, attrition resistance, and the like are adversely affected.

In the present invention it has been discovered that lithium has unusual properties for modifying the pore size and/or surface area characteristics or porous refractory oxide particles. Accordingly, it is an object of this invention to provide a method using lithium promoters for increasing the average pore diameter and decreasing the surface area of porous refractory oxide particles, especially with respect to regenerated catalytic supports. A further object is to provide a method for substantially altering the physical properties of precalcined gamma alumina particles without causing substantial phase transformation to other forms of alumina. A further object still is to alter the physical properties of support particles to a greater degree than would be possible by calcining in the absence of lithium under more severe conditions than those employed with lithium promoters utilized in the invention. Yet another object is to provide catalytic supports having physical characteristics obtained through use of lithium promoters. Still another object is to utilize these catalytic supports as components of catalytic compositions, useful in the hydroprocessing of hydrocarbons, and most particularly in hydrodesulfurization. These and other objects and advantages of the invention will be apparent from the following description.

SUMMARY OF THE INVENTION

Briefly, the invention provides a method for modifying the physical characteristics of porous refractory oxides by incorporation of a lithium promoter and subsequent calcination at elevated temperatures, the resulting product being useful as a catalyst support. Catalyst supports prepared in accordance with the invention have a decreased surface area and/or increased average pore diameter in comparison to the original porous refractory oxides. In one embodiment, catalytic support materials of the present invention are prepared by incorporating porous refractory oxide support particles with a lithium component, and calcining the dried composite, at an elevated temperature usually greater than about 1200° F. The resulting support material is particularly suitable in hydrodesulfurization catalysts.

DETAILED DESCRIPTION OF THE INVENTION

The present invention is directed to a method for modifying the physical characteristics of refractory oxide particulates by increasing the average pore diameter and/or decreasing the surface area thereof. The modified refractory oxides provided by the method of the invention find usefulness as catalyst supports, and particularly in catalysts used in hydrodesulfurization, especially when a high degree of demetallization in conjunction with the desulfurization is desired.

Any of a number of materials containing porous refractory oxides may be suitable for treatment herein including silica, silica-magnesia, zirconia, silica-zirconia, etc. Preferred refractory oxides comprise aluminum and are usually selected from the group consisting of alumina and silica-alumina. Gamma alumina is the most highly preferred refractory oxide, as is gamma alumina, stabilized with between about 0.5 and 5.0 weight percent of silica.

For catalytic purposes, the foregoing refractory oxides are usually prepared in the form of shaped particulates by methods well known in the art, with the preferred method being to extrude an inorganic refractory oxide gel, such as a spray-dried or peptized alumina gel, through a die having openings therein of the desired size and shape, after which the extruded matter is cut into extrudates of desired length. Preferred refractory oxide particles are of spherical shape or of cylindrical shape having a cross-sectional diameter of 1/32 to ¼ inch and a length of 1/32 to ¾ inch. Also preferred are refractory oxide particles having lengths between 1/32 and ¾ inch and having cross-sectional shapes resembling that of a three-leaf clover, as shown, for example, in FIGS. 8 and 8A of U.S. Pat. No. 4,028,227. Preferred clover-shaped particles are such that each "leaf" of the cross-section is defined by about a 270° arc of a circle having a diameter between about 0.02 and 0.04 inches.

Refractory oxide support particles prepared in the form of extrudates are generally precalcined, especially if gamma alumina is the desired support material. Temperatures above about 900° F. are usually required to convert the alumina gel or hydrated alumina to gamma alumina. Typically, temperatures between about 1100° F. and 1400° F. are utilized to effect this transformation, with holding periods of one fourth to three hours generally being effective to produce the preferred gamma alumina extrudates.

Refractory oxide particulates prepared by the foregoing methods or their equivalents generally have a surface area between 10 m$^2$/gram and 500 m$^2$/gram, a total pore volume between 0.2 cc/gram and 2.0 cc/gram, and an average pore diameter between 5 angstroms and 1000 angstroms. Because the physical characteristics of any given refractory oxide may not be acceptable, or may be less desirable, than refractory oxides of different physical characteristics for a given purpose, the invention provides a method for increasing the average pore diameter and/or decreasing the surface area and total pore volume of refractory oxides where such modifications would be of benefit. For example, as shown in the Example hereinafter, a catalyst support having a surface area of about 260 m$^2$/gram, an average pore diameter of about 100 angstroms, and a total pore volume of about 0.6 cc/gram, may be treated in accordance with the invention so as to provide a catalyst having a surface area of about 80 m$^2$/gram, an average pore diameter of about 200 angstroms, and a total pore volume of about 0.4 cc/gram. The resultant catalyst, due to its larger average pore size, is useful in hydrodesulfurization of hydrocarbons.

In order to modify the physical characteristics of the refractory oxide particles in accordance with the invention, a lithium component is required. Generally, lithium salts having thermally decomposable anions are utilized. Useful lithium salts in the invention include lithium hydroxide, lithium formate, lithium bicarbonate, preferably lithium acetate, and lithium carbonate, and most preferably lithium nitrate. As those skilled in the art will be aware, other lithium components may also be utilized, with the choice of lithium component depending upon a number of factors, as for example, whether or not the anion associated with the lithium will, if it should itself become incorporated in the refractory oxide during the method of the invention, detrimentally affects the ultimate product for its intended purpose.

In the method of the invention, the refractory oxide is incorporated with the lithium component, as by impregnation. In one embodiment, a spray impregnation technique is employed wherein the lithium-containing solution is sprayed on the refractory oxide particles. Another impregnating method, often used to produce relatively high weight percentages of lithium, is the circulation or multi-dip procedure wherein the refractory oxide is repeatedly contacted with a lithium-containing solution with or without intermittent drying. Another method, the pore volume or pore saturation technique, is preferred. This method involves dipping a refractory oxide into a lithium-containing solution having a volume usually sufficient to just fill the pores of the oxide and, on occasion, may be up to about ten percent excess.

Comulling methods are also appropriate. Thus, a refractory oxide may be comulled with a solid lithium salt and then moistened with sufficient water to produce a paste extrudable through a die. Alternatively, the refractory oxides may be comulled with an aqueous solution of lithium salt until an extrudable paste is formed.

After the refractory oxide is compounded with the lithium component by the foregoing methods or their equivalents, the composite is usually dried by conventional methods. Generally, the composite is dried at a temperature in the range from about room temperature or ambient to about 300° F. for at least about two hours.

The composite of lithium and refractory oxide is then calcined at an elevated temperature, usually greater than about 1200° F. Preferably, the composite is calcined for about 0.25 to about 12 hours at a temperature greater than about 1400° F. and, most preferably, at a temperature of about 1400° F. to about 1600° F.

The pore structure of this calcined composite of lithium component and refractory oxide is modified as compared to that of the refractory oxide prior to treatment by the method of the invention. Typically, the average pore diameter is substantially increased, usually from about one to about four times and, preferably, about two to about three times that of the original material. Additionally, the calcined, lithium-treated material has a reduced surface area, usually from about 0.1 to about 0.9 times, and preferably about 0.25 to about 0.8 times the surface area of the original material. Moreover, the total pore volume is reduced after lithium treatment, usually from about 0.5 to about 0.95 times the originally measured pore volume. The degree of reduction of the surface area and total pore volume and the increase in the average pore diameter of the refractory oxide depends, inter alia, on the calcination temperature, the particular refractory oxide utilized, and the quantity of lithium component used. Usually, the refractory oxide contains at least about 0.01 weight percent lithium components, calculated as Li. However, one skilled in the art may effect a particular degree of modification of the pore structure by adding increased amounts of lithium components and calcining at a lower temperature or decreasing the lithium component weight percentage and calcining at a higher temperature.

The larger pore refractory oxide particles produced by the method of the invention are of especial use in overcoming diffusion limitations as to large molecules. For example, enlarging the pore sizes of a hydrodesulfurization catalyst will allow relatively large metal-containing and/or sulfur-containing prophyrin molecules greater access to the catalytic active sites, thereby improving its efficiency for removing sulfur and/or metal-containing molecules.

The modified refractory oxide particles may be used as supports for hydroprocessing catalysts, especially with respect to hydrodesulfurization catalysts. A refractory oxide used for hydrodesulfurization purposes preferably contains gamma alumina and/or silica-stabilized alumina and, after treatment by the method of the invention, usually has a surface area below 250 m$^2$/gram, preferably below 180 m$^2$/gram and usually in the range of about 40 to about 250 m$^2$/gram, and more preferably about 50 to 180 m$^2$/gram, and most preferably between about 60 and 150 m$^2$/gram as measured by the B.E.T. method. Additionally, the average pore diameter is ordinarily above 50 angstroms, usually above about 100 angstroms, preferably above 140 angstroms and most preferably above 150 angstroms with the average pore diameter usually falling in the range of about 50 to 400 angstroms and preferably about 100 to 250 angstroms. Furthermore, the total pore volume is between about 0.3 and about 1.0 cc/gram with a sorption capacity sufficient to retain the desired amount of components in a single step. The preferred pore volume is between 0.4 and 0.8 cc/gram as measured by standard water or mercury/helium differential tests for pore volume.

A contemplated use of the method of the invention is to modify the average pore diameter and/or surface area of regenerated catalytic support particles or those catalytic support particles that have been employed in previous catalytic use and undergone component extraction and related methods, i.e., "regenerated blanks." Often, it is desirable to produce a uniform increase in the average pore diameter of these regenerated blanks as well as unused support particles ("blanks") so that large molecules will have access to a greater number of active sites on the catalytic support particle. For example, regenerated blanks, previously used primarily for removal of relatively small sulfur-containing molecules in the process of hydrodesulfurization, may be treated in accordance with the invention and subsequently used as catalytic support particles for catalysts in a hydrodesulfurization process primarily directed to removing metals contained in relatively large asphaltene molecules.

Refractory oxide particles modified with lithium in accordance with the invention are useful in a number of applications, such as sorption, catalysis, hydrocarbon refining, and particularly in catalytic hydroprocessing with catalysts comprising one or more additional active components, usually including a hydrogenation component. Typical hydrogenation components include the Group VIB and Group VIII metals and their compounds, with the most preferred hydrogenation components being the oxides and sulfides of Group VIII and Group VIB metals. The most useful Group VIII metals include iron, cobalt, and nickel, of which cobalt and nickel are preferred; the most useful Group VIB metals include chromium, molybdenum, and tungsten, of which molybdenum and tungsten are particularly preferred. Combinations of molybdenum and cobalt or nickel are most preferred.

The catalyst compositions of the invention generally contain between about 2 and 6 weight percent Group VIII metal components, calculated as the monoxides, between about 6 and about 16 weight percent Group VIB metal components, calculated as the trioxides, and the remainder being the refractory oxide support containing lithium components in a proportion between about 0.1 and 10 weight percent, calculated as Li. Catalysts comprising cobalt or nickel, molybdenum, and lithium are especially preferred when supported on alumina-containing support particles modified with lithium in accordance with the invention, and particularly when used for demetallization of hydrocarbons.

The aforementioned additional active components may be incorporated with the lithium-modified refractory oxides by any of the impregnation or other techniques known in the art. For example, cobalt or nickel and molybdenum-containing solutions may be used to impregnate the lithium-modified refractory oxide followed by calcination to convert the active components to their oxide form. The resultant catalyst, containing the active metals in the oxide form has physical characteristics similar to those of the lithium-modified refractory oxide itself.

Any of a number of processes utilizing catalysts containing porous support particles may utilize these lithium-modified catalysts, as for example, hydroprocessing. The preferred process, hydrodesulfurization of a crude oil or a reduced fraction thereof, may be accomplished by passing the feedstock over the above-mentioned catalyst. When demetallization is desired, the organometallic and/or inorganic metallic contaminants which may be removed include those of vanadium, nickel, iron, sodium, zinc, copper, and arsenic. Sulfur may also be removed by this process.

Feedstocks contemplated herein include broadly all liquid hydrocarbon mixtures, including whole crudes, which contain metals in a total concentration above about 30 ppmw, preferably between 50 and 500 ppmw. However, since the metallic poisons which deactive hydrotreating and cracking catalysts are generally associated with asphaltene components of the oil, the process will be more commonly applied to the higher boiling fractions in which the asphaltene components concentrate. Especially contemplated are atmospheric and vacuum distillation residues containing more than 1.0 weight percent sulfur and more than 50 ppmw of nickel plus vanadium. Typical feedstocks include those having an API gravity between 6 and 30 and preferably between 10 and 25 degrees. However, one skilled in the art may choose to increase the API gravity of the feedstock by, for example, blending it with one of a higher degree so as to compliment existing commercial refining equipment.

Hydroprocessing, especially hydrodesulfurization, and most particularly when a high degree of demetallization is also desired, is herein carried out by contacting the feedstock at elevated temperatures and pressures with one or more of the previously mentioned catalysts. The process may be conducted in either hydrogen or inert atmospheres but it is preferred that it be done in the presence of hydrogen, especially when the process is to be performed prior to other catalytic refining operations such as cracking, hydrocracking and/or hydrotreating. Typical hydrodesulfurization conditions are generally employed so that the process is more adaptable for use in a commercial refinery, such conditions being as follows:

| Operating Conditions | Broad Range | Preferred Range |
|---|---|---|
| Temperature, °F. | 500–900 | 600–850 |
| Hydrogen Pressure, psig | 500–3000 | 1000–2500 |
| Space Velocity, LHSV | 0.05–3.0 | 0.1–1.5 |
| Hydrogen Recycle Rate, scf/b | 1000–15000 | 2000–10000 |

In a preferred method of operation, the hydrocarbon feedstock is passed upwardly or downwardly through a stationary bed of catalyst. Fluidized (or ebullient) beds, slurries or batch reactors can also be employed.

Typically, catalysts employed for hydroprocessing hydrocarbons, if in the oxide form, are generally rendered more active by conversion to either the sulfide or free metal form. Conversion of the oxides of the active components to sulfide or free metals, if desired, can be accomplished by respectively presulfiding or prereducing the catalyst. Typical conditions for presulfiding or prereducing include passing, respectively, a sulfiding or reducing gas over the calcined catalyst at a temperature between 300° and 700° F. at a space velocity between about 150 and 400 v/v/hr for about 2 hours. Hydrogen is usually used to prereduce the catalyst while a mixture of hydrogen and one or more components selected from the group consisting of the sulfur compounds (e.g. lower molecular weight thiols, organic sulfides, especially $H_2S$) and sulfur vapor is suitable for presulfiding. Generally speaking, the relative proportion of hydrogen in the presulfiding mixture is not critical, with any proportion of hydrogen ranging between 10 and 90 percent by volume being adequate.

If the catalyst is to be used in its sulfided form, it is preferred that it be presulfided. However, since it is contemplated that the catalyst is often used under the hydrodesulfurization conditions hereinbefore recited and with feedstocks containing 1.0 weight percent or more of sulfur, the catalyst may be effectively sulfided in situ during processing of such feedstocks.

The following comparative Example demonstrates the effectiveness of lithium promoters for improving the physical characteristics of hydrodesulfurization catalysts; the Example is not intended to limit the scope of the invention which is defined in the claims.

EXAMPLE

An experiment is performed to compare the physical properties of catalysts prepared with identical gamma alumina support particles, but with one catalyst containing more than 2.0 weight percent lithium components due to treating support particles with a lithium-containing solution. In the following description of the preparation method of the catalysts, it will be understood that the support particles utilized in each instance have lengths between 1/32 and ¾ inch and have cross-sectional lengths resembling that of a three-leaf clover, as shown, for example, in FIGS. 8 and 8A of U.S. Pat. No. 4,028,227. Additionally, the support particles are initially in precalcined form, having been calcined at about 1200° F. for one hour prior to contact with any impregnant solution.

Catalyst A

Lithium nitrate trihydrate (85 grams) is dissolved in enough water to make 180 ml of impregnant solution. Support particles (243 grams) are then contacted with the impregnant solution. Substantially all 180 ml of the impregnant solution is taken up by the support. The lithium-impregnated composite is oven-dried at 250° F. and calcined at about 1500° F. for one-half hour in flowing air.

Ammonium heptamolybdate (149.5 grams) is then dissolved in enough water to make 540 ml of solution. The calcined lithium-impregnated composite is then contacted with this solution. One hundred fifty-four ml of this solution is taken up by the calcined lithium-impregnated composite. The resulting impregnated support is oven-dried at 250° F. and then calcined at 500° F. for one-half hour in flowing air.

Nickel nitrate hexahydrate (87.5 grams) is then dissolved in enough water to make 522 ml of solution. The calcined catalyst is then contacted with 164 ml of this solution to substantially pore-saturate the catalyst. The composite is oven-dried at 250° F. and calcined at 900° F. for ¾ hour in flowing air. The final catalyst has the following nominal composition: 14 weight percent molybdenum components, calculated as $MoO_3$, and 2.6 weight percent nickel components, calculated as NiO, on gamma alumina support particles containing 2.0 weight percent lithium components, calculated as Li.

Catalyst B

This catalyst is prepared in a manner similar to that of Catalyst A except the support particles are not contacted, dried, or calcined with lithium nitrate trihydrate solution.

From the ammonium heptamolybdate and nickel nitrate solutions used to prepare Catalyst A, 173 ml of the ammonium heptamolybdate solution and 168 ml of the nickel nitrate hexahydrate solution are taken up by the support particles. The final catalyst has the following nominal composition: 14 weight percent molybdenum components, calculated as $MoO_3$, and 2.6 weight percent nickel components, calculated as NiO, on gamma alumina support particles.

Physical properties of four identical portions of gamma alumina supports (C,D,E and F) and the two above-described catalysts (A and B) are summarized in Table 1. The supports C, D, E and F are identical to those of A and B and contain essentially no impregnated metals, but are pre-calcined at 1800° F., 1600° F., 1400° F. and 1200° F., respectively.

TABLE 1

| | | Highest Calcination Temp. °F. | Total Surface Area $m^2/gm$ | Total Pore Volume cc/gm | Average Pore Diameter Angstroms |
|---|---|---|---|---|---|
| A | Catalyst | 1500 | 85 | 0.42 | 198 |
| B | Catalyst | 1200 | 227 | 0.53 | 94 |
| C | Gamma Alumina (no metals) | 1800 | 154 | 0.60 | 156 |
| D | Gamma Alumina (no metals) | 1600 | 216 | 0.62 | 115 |
| E | Gamma Alumina (no metals) | 1400 | 251 | 0.64 | 102 |
| F | Gamma Alumina (no metals) | 1200 | 259 | 0.62 | 96 |

In view of the data in Table 1, Catalyst A prepared in accordance with the invention has about 0.2 to about 0.5 times the surface area and about 0.5 to about 0.85 times the total pore volume than that of the comparative materials. Catalyst A contains an average pore diameter that is approximately twice that of a conventional catalyst (Catalyst B). Moreover, the average pore diameter of the catalytic particles prepared in accordance with the invention is approximately twice that of non-impregnated gamma alumina support particles (F) that are calcined at 1200° F. Additionally, the average pore diameter of Catalyst A, calcined at 1500° F., is clearly greater (approximately 1.3 to about 1.9 times) than that of unimpregnated gamma alumina support particles (C and D), calcined at the higher temperatures of 1800° F. and 1600° F., respectively. These data show that lithium is highly effective in influencing or promoting changes in physical characteristics of porous refractory oxides, even exceeding that obtainable by 300° F. higher calcination.

The data also indicate that, if what is desired are support particles consisting essentially of gamma alumina of improved physical characteristics, then the method of the invention proves highly useful for this purpose. Support particles C and D, due to their high calcination temperature, undoubtedly contain one or more transitional forms of alumina, formed at a higher temperature than gamma alumina, inter alia, delta, theta, alpha, which affect the ultimate surface area and physical characteristics thereof, whereas supports E and F, consisting essentially of gamma alumina, are relatively unaffected by the calcinations at 1400° and 1200° F., respectively. But the catalyst of the invention, Catalyst A, having a support containing virtually all its alumina in the form of gamma alumina, has substantially improved physical properties without the formation of the aforementioned higher temperature transitional aluminas in significant proportions.

Having now described the invention, we claim:

1. A method for hydroprocessing a hydrocarbon feedstock which comprises contacting said feedstock with hydrogen under conditions of elevated temperature and pressure in the presence of a catalytic composition comprising metallic hydrogenation components on a material comprising a lithium-containing refractory oxide, said lithium-containing refractory oxide having been calcined at a temperature greater than about 1,200° F. to produce a lithium-containing refractory oxide having an increased average pore diameter as compared to said lithium-containing refractory oxide without lithium, said composition having an average pore diameter above about 100 angstroms.

2. The method defined in claim 1 wherein said composition is prepared by a method including the steps of incorporating said lithium component with said material and calcining the lithium-incorporated material.

3. The method defined in claim 1 wherein said method for hydroprocessing is hydrodesulfurization.

4. The method defined in claim 1 wherein said method is performed prior to other catalytic refining operations.

5. The method defined in claim 4 wherein said other catalytic refining operations involve cracking.

6. A process for hydrodesulfurizing a hydrocarbon feedstock which comprises contacting said feedstock with hydrogen under conditions of elevated temperature and pressure in the presence of a catalytic composition prepared by a method comprising incorporating a porous refractory oxide with a lithium component, calcining the lithium-incorporated porous refractory oxide to form a lithium component-containing composition having an increased average pore diameter than that of said porous refractory oxide and incorporating a Group VIB metal component with said composition.

7. The process defined in claim 6 wherein said lithium component-containing composition has an increased average pore diameter between about one and about four times that of said porous refractory oxide.

8. The process defined in claim 6 wherein said catalytic composition further comprises at least one Group VIII metal hydrogenation component.

9. The process defined in claim 6 wherein said lithium component-containing composition has a surface area between about 0.1 and about 0.9 times that of said porous refractory oxide.

10. The process defined in claim 6 wherein said feedstock comprises a liquid hydrocarbon mixture containing metals in a total concentration above about 30 ppmw.

11. The process defined in claim 6 comprising demetallization.

12. The process defined in claim 6 wherein said catalytic composition comprises between about 0.1 and about 10 weight percent of said lithium components.

13. The process defined in claim 6 wherein said porous refractory oxide contains gamma-alumina.

14. The process defined in claim 6 wherein said feedstock is selected from the group consisting of atmospheric and vacuum distillation residues containing more than about 1.0 weight percent of sulfur.

15. The process defined in claim 6 wherein said conditions include an elevated temperature from about 500° F. to about 900° F. and an elevated hydrogen pressure from about 500 psig to about 3,000 psig.

16. The process defined in claim 6 wherein said catalytic composition has an average pore diameter greater than about 100 angstroms.

17. A process for hydrodesulfurizing and demetallizing a hydrocarbon feedstock containing more than 1.0 weight percent of sulfur and more than 50 ppmw of nickel plus vanadium metal contaminants, said process comprising contacting said feedstock with hydrogen in the presence of a catalytic composition comprising Group VIB and Group VIII metals on an alumina-containing porous refractory oxide comprising at least about 0.1 weight percent of lithium, calculated as Li, said composition prepared by the method comprising the steps of:

(1) incorporating a porous refractory oxide with a lithium component;

(2) calcining the lithium-incorporated porous refractory oxide at a temperature greater than about 1,200° F. to produce a lithium component-containing composition having an increased average pore diameter between about one and about four times that of said porous refractory oxide; and (3) incorporating at least one Group VIB and at least one Group VIII metal hydrogenation component with said composition obtained from step (2).

18. The process defined in claim 17 wherein said composition obtained from step (3) has a surface area below about 250 m²/gram and has an average pore diameter greater than 100 angstroms.

19. The process defined in claim 17 wherein said temperature in step (2) is between about 1,400° F. and about 1,600° F.

20. The process defined in claim 17 wherein said Group VIB metal hydrogenation component is selected from the group consisting of molybdenum, chromium and tungsten, and said Group VIII metal hydrogenation component is selected from the group consisting of iron, cobalt and nickel.

* * * * *